US005446273A

United States Patent [19]

Leslie

[11] Patent Number: 5,446,273

[45] Date of Patent: Aug. 29, 1995

[54] CREDIT CARD SECURITY SYSTEM

[76] Inventor: William M. Leslie, 5873 Gullstrand St., San Diego, Calif. 92122

[21] Appl. No.: 221,838

[22] Filed: Feb. 24, 1994

Related U.S. Application Data

[63] Continuation-in-part of Ser. No. 850,921, Mar. 13, 1992, abandoned.

[51] Int. Cl.[6] .............................................. G06K 19/07

[52] U.S. Cl. .................................... 235/487; 235/454; 235/492

[58] Field of Search ....................... 235/454, 487, 492

[56] References Cited

U.S. PATENT DOCUMENTS 4,904,853 2/1990 Yokokawa .......................... 235/487

*Primary Examiner*—Harold Pitts

[57] ABSTRACT

This invention relates to a credit card and security system to prevent use of credit cards, identification cards and the like by other than the assigned holder of the cards by inserting identifying information in electronic distorted form pertaining only to assigned holder, hidden within the card. The system provides for the person checking the validity of the card to see it undistorted and to examine the hidden information, to determine positively if the person presenting the card is the assigned holder of the card and decide if the card should be honored.

2 Claims, 1 Drawing Sheet

CREDIT CARD SECURITY SYSTEM

CROSS REFERENCE TO RELATED APPLICATION

This application is a C.I.P. of Ser. No. 07/850,921 filed Mar. 13, 1992 now abandoned.

FIELD OF THE INVENTION

This invention relates to a new type of credit card security system and identification card system that, in combination, provides a number of security devices that prevent illegal use of credit cards, if lost or stolen.

This system comprises forming a distorted information display of credit card information, including personal information about the card owner, on a viewable card in which the distorted display may be rendered undistorted, providing a display that is then compared to personal information about the card holder, to verify that the credit card presented is the card of the card holder. This system also provides security devices that positively determine if the person presenting the card is the true owner of the card or identification card.

BACKGROUND OF THE INVENTION

The systems currently in use for preventing use by others of stolen or lost credit cards are essentially all alike. They primarily rely upon the holder or user's name and account number that are embossed on the card. Some cards have art designs, holograms, and some identification cards have added a photo of the user. Professionals who have been making fake passports for years would have no problem with changing the photo on a card, as they do on a passport. The photo works to the advantage of the fake card maker because it adds another level of authenticity to the fake card.

Credit card companies usually require for security against loss or theft, that the card be signed on the reverse side by the user/holder. This signature is compared by the sales clerk with the signature on the sales receipt which must be signed by the purchaser. If the signatures match, then the card is deemed to be valid and is accepted for credit. But these systems have not been entirely effective, according to reports from banks and others who issue credit cards. Such institutions have reported large losses through unauthorized use of credit cards by other than the owners. A person planning illegal use of a credit card having a signature on the back can practice writing the signature. Few of the forgers are caught. So the rate of lost and stolen cards is high and reportedly going higher while the issuing companies continue to pay for unauthorized charges against cards until the user learns that his card is missing and reports it to the issuing company or bank.

By contrast, the identification card and system of this invention is effective in stopping illegal use of the card in the first instance, that is before it can happen. When the card containing the security devices of this invention is presented for identification or payment at a business place, the card is inserted into a detection apparatus that compares the appearance and other personal data of the person who is presenting the card with, for example, front and side photos of the card holder, display of the card holder's driver's license, the card holder's signature, his social security number and phone number; all concealed within a distorted image on or in the credit card. The display at the store displays the distorted information in a restoring control signal that restores the distorted information to a clear decoded display. This display can be compared directly with the person presenting the card to determine with assurance that the presenter is the owner of the card.

While the probability of look alikes is remote, the system of this invention displays such complete and authentic identifying information, usable by the person verifying the card, that the verifying person can make an unquestionable decision regarding the person presenting the card. In addition, a person that is illegally presenting a lost or stolen card and has not seen the card owner's signature, as the signature is not on the surface of the card, but is hidden in the card, must realize, when he signs the sales slip, that in writing a false signature, he is committing attempted forgery as well as attempted theft of money or merchandise in use of the card, and that both of these illegal acts will be revealed immediately to the store clerk when he presses the card into the slot. These illegal acts will end when these special cards come into general use.

SUMMARY OF THE INVENTION

This invention protects the holder or owner of the credit card and the issuing company of these special credit cards in at least three ways. The first is that the card presented by other than the owner is immediately detected because of the large amount of verifiable evidence present. Secondly, illegal use of the account number for phone or mail orders is not possible as the account number is not on the surface of the card. Third, illegal use of the account number taken from carbon copies of sales receipts for phone or mail orders, is prevented because no carbon copies of the numbers are made.

The aforesaid method prevents credit card fraud by comparing large amounts of data which are made available and which are inspected through the use of this invention in identification devices that verify whether documents submitted have the specific signature and the other related identification information.

Secondary objectives of this invention are to eliminate or reduce the cost of accessories, used to verify present credit card systems, such as telephone lines that are permanently connected to outside main frame computers, eliminate or reduce the charges for use of outside main frame computers, and for use of magnetic strip devices, in addition to the time consuming delays that occur in accrediting and verifying existing type credit cards and to delays occurring in operations of or breakdown of computers and phone lines.

BRIEF DESCRIPTION OF THE DRAWINGS

The present invention will be better understood from the following detailed description of a preferred embodiment of this invention, taken in conjunction with the accompanying drawings, in which like reference numerals refer to like parts throughout and in which.

DESCRIPTION OF THE PREFERRED EMBODIMENT

Figure 1:
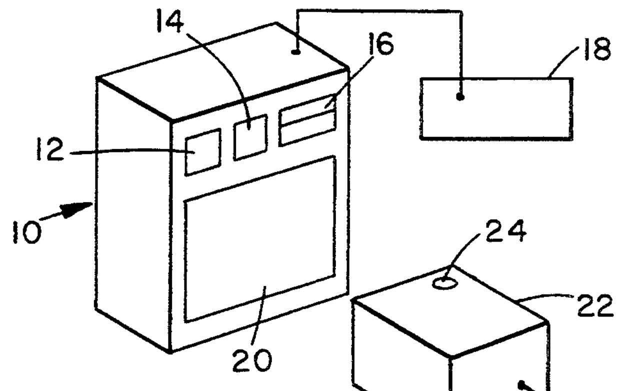
FIG. 1 is an overall layout of the elements for providing the distorted display of credit card user information onto a displayable credit card.

Referring to FIG. 1, there is disclosed the parts of the system that record information personal to the card holder onto a display medium, that may be displayed by use of, for example, infrared light. Video terminal 10 has a video display 20 on which information is inputted for display by keyboard 18 in the known manner. Above the display is positioned other illuminated information in card or sheet form. Examples are photograph 12, copy of the owner's driver's license and other information in space 14 and space 16, information such as social security number, sample of card owner's signature, and other identification type information. Other information inputted to video display 20 by keyboard 18 would be the owner's address, home phone number, age, height, weight, and other personal identification information.

This information is displayed on the face of video terminal 10 and is then recorded in the known manner by video camera 22 that may be a cross coupled diode video type camera. This camera is turned on and off by switch 24. The output of video camera 22 sends video signals through lines 23 and 26. The signal through line 23 goes directly to monitor 32. The signal in line 26 is processed by a sine wave code controlled distortion device 28A. The sine wave code controlled distortion device is responsive to an AC sine wave which, for example, may be the sine wave of normal 60 cycle AC power. This sine wave modulation is applied to the normal scanning signal of either the video signal in line 26, or to the normal scanning signal in monitor 32. This provides distorted coding to video display 36 on monitor 32.

The modulating voltage has a relatively low frequency, such as a 60 cycle sine wave, is fed through line 31 to the monitor 32. The video signal in line 26 is processed by the sine wave code controlled distortion device 28A and it is distorted in a coded fashion by the sine wave and this signal is then fed through line 30 to monitor 32.

In operation, monitor 32 displays the video presentation from video camera 22 through line 23. This display is used by the operator to check the integrity of display 36 with that shown on display 10, namely displays 12, 14, 16 and 20. When this display is verified, reference FIG. 4, display 80, then push-button 40 is operated to display the distorted picture in display 36, reference FIG. 4, display 82. This distorted display may be distorted in the manner of operation of the sine wave code controlled distortion device 28A. In operation, the sine wave, or other wave form, code controlled distortion device provides low frequency, example 60 cycles, modulation distortion in the distorted display 36, reference FIG. 4, display 82.

Figure 4:
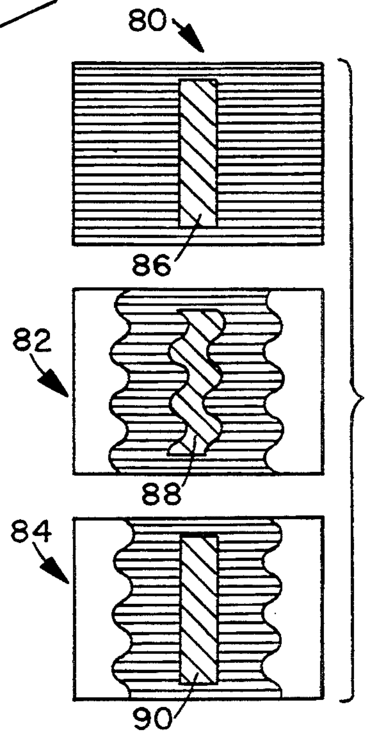
FIG. 4 is a representative display of the distorted and undistorted information displayed on the respective video displays used in the invention.

This modulation is comparable to the amplitude modulation of a radio frequency carrier wave with an audio tone sine wave. It can be applied to or induced into the horizontal, vertical or both scanning circuits to produce distortion of the picture as desired. Forms of scanning, vertical, horizontal or a combination of both, combined with variance of frequency of modulation and intensity of modulation, are represented in code number 38. The effect of this distortion is shown in FIG. 4 wherein display 80 shows a picture of the letter "I"-86 with normal scanning, no modulation of the scanning circuit and no distortion of the display on monitor screen 36, this condition at the card factory. Moving downward to 82, the letter "I"-88 is distorted by modulation of the horizontal scanning circuit of monitor screen 36, through the distortion control signals from the sine wave code controlled distortion device 28A. Letter "I"-88 in FIG. 4 illustrates the distorted signal, which is physically located in the center layer 56 of the card in FIG. 2, as carried by the owner. Moving to display 84, FIG. 4 shows letter "I"-90, displaying the effect of sine wave code control 28B, changing to opposite polarity of modulation control signals, reversing the effect of distortion, returning the picture, in viewing monitor 72 to decoded, undistorted, photo positive display, located in the business place.

The camera 44 is a film type camera that takes a photograph and produces a negative of the distorted picture in display 36. The developed film negative from camera 44 is then inserted in a credit card 50 that has translucent lamination covers 52 and 54, capable of penetration by infrared rays. The distorted data on layer 56 corresponds to that distorted image display 82 in FIG. 4.

The display 36 may also be printed by a printer 34 that receives the video print information through line 33 from monitor 32. The printer 34, which may be a dot matrix or laser type printer, prints all identifying data, such as photos, signatures, typed data, that are reproduced in a coded printed image, printed in a negative format similar to camera 44 negative, corresponding to the distorted display 36. This information may then be placed on a card similar to that of FIG. 2, which has a surface such that it may be displayed by a reflective display device.

Figure 2:
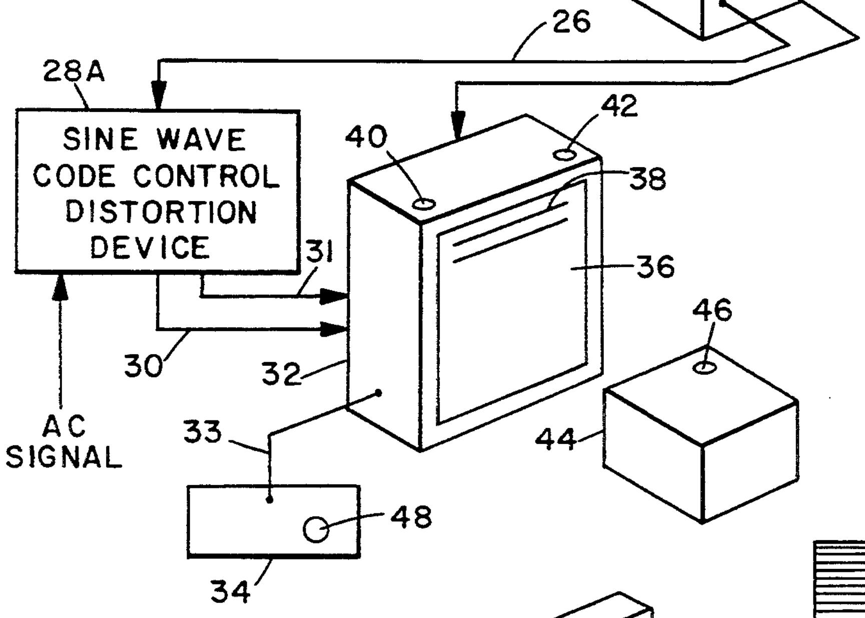
FIG. 2 is a display of the credit card with portions spread apart.
Figure 2:
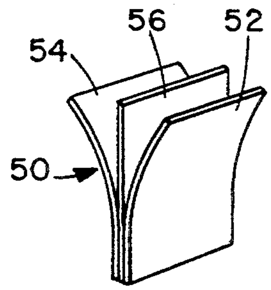
Figure 3:
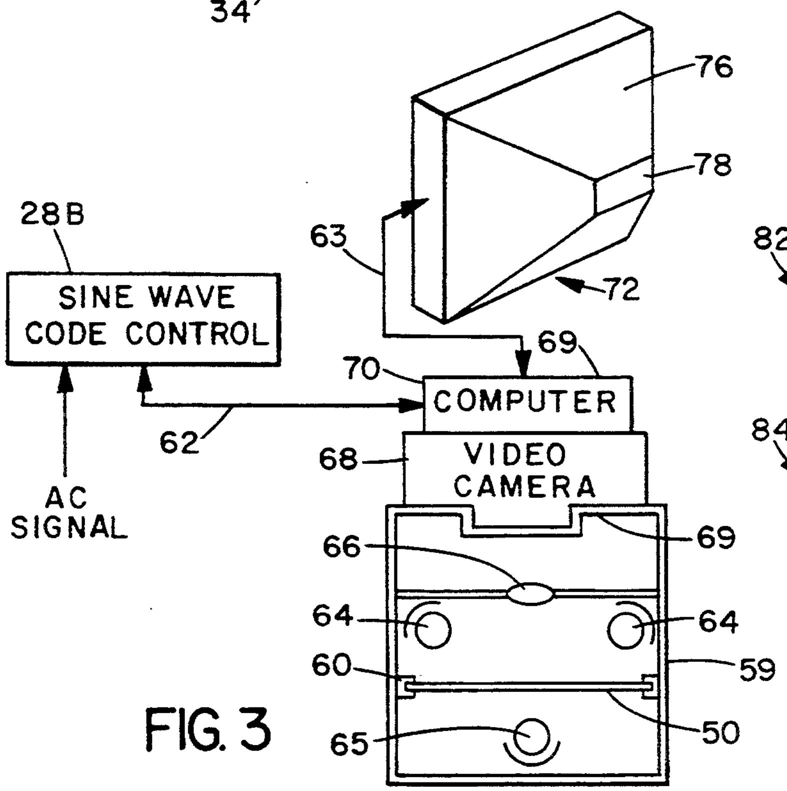
FIG. 3 is a layout of the combination of elements for undistorting the display for video presentation of the credit card, and for viewing the credit card information, to authenticate the holder's ownership thereof.

The credit card user thus carries with him the credit card carrying the printed negative display or the film negative display 50 of FIG. 2. This card is then presented by the card owner for credit at a place of business. The images on both film and printed display types of cards are photo negative, with provision in computer 70 to reverse to photo positive, by known means, when this special credit card is inserted in the slot in apparatus 59, for viewing in monitor 72.

The card owner's account number printed in binary numbers is distorted in the same manner as all other data on the credit card and is restored clear, not distorted, in monitor 72. Provision is made whereby card owner's account number is printed by known electronic means on dealer's copy only of sales ticket. In an alternative method the card owner's account number, which may be in purposely-extended binary type, is transferred from owner's credit card to dealer's copy of sales ticket by heat transfer to heat sensitive paper.

The business clerk, when receiving the card, then inserts the card 50 into the apparatus 59, and in holder 60. In apparatus 59, the card 50 includes the negative film from camera 44. The illuminating light 65 projects the negative image in card 50 through lens 66 to video camera 68 and to computer 70. Alternatively, when credit card 50 includes the printed sheet image produced by printer 34, then reflector lights 64 project the printed sheet image on the card 50 to camera 68, thence to computer 70. Both camera negative film image and printed sheet image are in photo negative format, now receive a sine wave code controlled signal from device 28B through line 62. The signal from sine wave code control device 28B is the same signal as that in sine wave code distortion control device 28A, matching the particular credit card 50. The computer 70, receiving either of the alternate images, then decodes the video signal from device 28B in the known manner to reverse polarity of the original 60 cycle sine wave coding, this now provides positive display data that was originally displayed on the monitor display screen 10. Thus the display on terminal 10, such as displays 12, 14, 16 and 20, are now changed back to normal, including photo positive format, and the identifying information concerning the card owner is displayed for verification by the clerk.

Monitor 72 has a viewing port 77 that, by means of side panels 76, restricts view of the displayed information to the clerk. So that in stores, places of business and the like, the view of displayed information about the credit card owner is restricted to the eyes of the clerk. Normally, the clerk compares the photographs on the display with the appearance of the user, and can also interrogate the user as to information such as his credit card number, driver's license number, data of birth and the like, as all of this data and more is available to his view.

Accordingly, this code signal is also transposed by the printer 34 to the printout display, in negative format, on the printed sheet that is inserted in the credit card 50. This code signal is also recorded on the negative film produced by camera 44. Thus, the code information is on the insert 56 in the credit card 50 of FIG. 2.

In operation of the apparatus 59, the display of the picture from the card 50 with the coded signal 38 is projected through lens 66 to the video camera 68 to the computer 70. The computer 70 has in its database the recorded sine wave distortion control signals with appropriately listed phases of distortion. These distortions are coded in the computer, the computer therefore searches for the coded distortion number to match that in card 50 to provide a particular sine wave code control device 28B to the computer, which is then applied to the particular coded distortion in the video signal 63 to the display monitor 72.

Accordingly, the particular distortion is selected at the display device 72 for use in displaying the credit card information for use by the clerk in the manner described.

The card 50, see FIG. 2, has protection sheets 52 and 54. These protection sheets can be transparent layers, translucent layers or semi-opaque layers. The semi-opaque layers can be used with infrared combined with white illumination and detection, to display the information on the monitor 72.

The foregoing description of the preferred embodiment has been presented for purposes of illustration and description. It is not intended to be exhaustive nor to limit the invention to the precise form disclosed, and many modifications and variations are possible in light of the above teaching. The embodiments were chosen and described to best explain the principles of the invention and its practical application to thereby enable others skilled in the art to best utilize the invention in various embodiments and with various modifications as are suited to the particular use contemplated, and it is intended that the scope of the invention be defined by the claims and their equivalents.

I claim:

1. A credit card and identification card security system comprising:

means for imparting information personal to a credit card holder, on or in said card, said information in indiscernible form, means for displaying said information on a first display, said first display including card information and video display information, a video camera for viewing and converting said first display into an undistorted video output signal, distortion means for imparting a predetermined distortion condition on said video output signal providing a distorted video output signal, a second video display responsive to said video output signal for displaying said first display in either the distorted or undistorted condition, means for displaying an undistorted code signal in said second video display, camera means for providing an image of said distorted display on a film that forms a credit card, means for displaying said film in said distorted image on a video camera providing an output video signal, second distortion means for detecting said code signal and providing a distortion means signal for removing the distortion of said first display to an undistorted display in output video signals, and third display means responsive to said output video signals for displaying said undistorted display for comparison with information personal to the credit card holder.

2. A credit card and identification card system comprising:

means for imparting information personal to a credit card holder on or in said card, said information in indiscernible form, means for displaying said information on a first display, including card information and video display information, a video camera for viewing and converting said first display into an undistorted video output signal, distortion means for imparting a predetermined distortion condition on said video output signal, providing a distorted video output signal, second video display means responsive to said video output signal for displaying said first display in either the distorted or undistorted condition, camera means for providing an image of said distorted display in an image form on a credit card, means for displaying said distorted display on said credit card onto a video camera, which camera provides an output video signal of said distorted display, second distortion means for providing a distortion means signal for removing the distortion of said first display on an undistorted display in output video signals, and third display means responsive to said output video signals for displaying said undistorted display for comparison with information personal to the credit card holder.

* * * * *